United States Patent
Akahori (10) Patent No.: US 11,079,840 B2
(45) Date of Patent: Aug. 3, 2021

(54) OPERATION DETERMINATION DEVICE AND OPERATION DETERMINATION METHOD

(71) Applicant: LAPIS Semiconductor Co., Ltd., Yokohama (JP)

(72) Inventor: Hiroji Akahori, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/239,617

(22) Filed: Jan. 4, 2019

(65) Prior Publication Data
US 2019/0212814 A1   Jul. 11, 2019

(30) Foreign Application Priority Data
Jan. 5, 2018  (JP) .............................. JP2018-000735

(51) Int. Cl.
*G06F 3/01* (2006.01)
*G06T 7/10* (2017.01)

(52) U.S. Cl.
CPC .............. *G06F 3/013* (2013.01); *G06F 3/017* (2013.01); *G06T 7/10* (2017.01); *G06T 2207/30041* (2013.01)

(58) Field of Classification Search
CPC . G06F 3/013; G06F 3/017; G06T 7/10; G06T 2207/30041
(Continued)

(56) References Cited

U.S. PATENT DOCUMENTS

2009/0267921 A1* 10/2009 Pryor .................. G06F 3/04883
                                                  345/177
2013/0097557 A1*  4/2013 Madau ............... G06K 9/00845
                                                  715/810
(Continued)

FOREIGN PATENT DOCUMENTS

JP    2005138755 A  *  6/2005
JP    2010-184600 A     8/2010
KR    101585466 B1  *  1/2016

OTHER PUBLICATIONS

Studytonight (Studytonight.com, Computer Architecture, Pipelining; accessed on Aug. 16, 2020 at https://web.archive.org/web/20170521090527/https://www.studytonight.com/computer-architecture/pipelining) (Year: 2017).*
(Continued)

*Primary Examiner* — Mark Edwards
(74) *Attorney, Agent, or Firm* — Rabin & Berdo, P.C.

(57) ABSTRACT

An operation determination device determines an operation performed by a user in a non-contact manner on a display image. An image acquisition unit acquires a photographed image of the user, and an image processing unit performs image processing on the photographed image and determines the position of the line-of-sight of the user, the position of the fingertip, and the movement of the fingertip with respect to the display image. The image processing unit includes a first processing unit configured to detect the positions of the eyes and fingertip of the user in the photographed image, and a second processing unit that calculates the position of the user's sight line and fingertip with respect to the display surface based on the detected positions of the user's eyes and the fingertip in the photographed image and that determines a movement of the user's fingertip.

9 Claims, 8 Drawing Sheets

(58) Field of Classification Search
USPC .......................................................... 345/156
See application file for complete search history.

(56) References Cited

U.S. PATENT DOCUMENTS

2014/0184494 A1\* 7/2014 Burachas ................ G06F 3/011
345/156
2019/0108447 A1\* 4/2019 Kounavis ........... G06K 9/00355

OTHER PUBLICATIONS

Wong, W.G., Electronic Design, 2011; "How Microsofts Primesense-based Kinect Really Works", Mar. 16, 2011; retrieved from https://www.electronicdesign.com/technologies/embedded-revolution/article/21795925/how-microsofts-primesensebased-kinect-really-works (Year: 2011).\*

\* cited by examiner

FIG. 7

OPERATION DETERMINATION DEVICE AND OPERATION DETERMINATION METHOD

TECHNICAL FIELD

The present invention relates to an operation determination device and an operation determination method.

BACKGROUND ARTS

In recent years, more and more vehicles such as automobiles are equipped with a head-up display (hereinafter referred to as HUD). The HUD displays images by superimposing them on the windshield in front of the driver's seat, for example. For this reason, the display by HUD has an advantage of communicating information without causing the driver to glance away from the windshield.

However, when certain operations are to be performed, the driver needs to use switches on the console, and therefore, they need to glance away from the windshield. In order to solve this problem, a device is proposed that allows the driver to operate an operation unit such as switches without actually touching them, by detecting an operation by the user based on images obtained by photographing the motions of the hands of the user and the like and by determining what kind of operation is being performed (for example, Japanese Patent Application Laid-Open Publication No. 2010-184600 (Patent Document 1)).

SUMMARY OF THE INVENTION

In the device disclosed in Patent Document 1, a computer installed in the device performs processes such as image processing of a hand image, determination of the operation based on the result of the image processing, displaying images corresponding to the operation, and the like. That is, a series of processes including image processing is performed by software.

However, image processing to generate information to be used for the judgment of an operation from the images obtained by photographing the motions of a hand is complicated, and a great number of calculations need to be performed. Therefore, when such image processing is performed by software, problems such as slow processing speed and large power consumption occur.

The present invention was made in view of the above-mentioned problems, and an object thereof is to provide an operation determination device capable of determining a non-contact operation on a display image with high speed and low power consumption.

An operation determination device according to the present invention is an operation determination device configured to determine an operation performed by a user in a non-contact manner on a display image, including: an image acquisition unit that acquires a photographed image obtained by photographing the user; and an image processing unit that performs image processing on the photographed image and that determines a position of a line-of-sight of the user, a position of a fingertip of the user, and a motion of the fingertip of the user with respect to the display image, wherein the image processing unit include a first processing unit that detects a position of the user's eyes and fingertip in the photographed image; and a second processing unit that calculates a line-of-sight and the fingertip of the user with respect to a display surface where the display image is displayed, based on the detected positions of the user's eyes and fingertip in the photographed image and that determines a motion of the fingertip of the user, wherein the first processing unit is constituted of hardware that executes a prescribed detection process, and wherein the second processing unit is constituted of software that executes a process corresponding to an output of the first processing unit.

An operation determination method according to the present invention is an operation determination method in a motion operation device that receives a user's non-contact operation on a display image, including: acquiring a photographed image obtained by photographing the user; detecting a position of the user's eyes and fingertip in the photographed image by hardware configured to execute prescribed detection processes; calculating, by software, a position of a line-of-sight and a position of the fingertip of the user with respect to a display surface where the display image is displayed; and determining, by software, a motion of the fingertip of the user with respect to the display image.

According to the operation determination device of the present invention, it is possible to determine a non-contact operation performed on the display image with high speed and low power consumption.

DETAILED DESCRIPTION OF THE EMBODIMENTS

Below, embodiments of the present invention will be described with reference to the figures. In the descriptions of the respective embodiments and the appended figures, substantially the same or equivalent parts are denoted by the same reference characters.

Embodiment 1

A motion operation device 100 of the present embodiment is installed in a vehicle such as an automobile having an image display device such as a head-up display (hereinafter referred to as HUD). The motion operation device 100 is an operation determination device configured to determine a non-contact operation performed by a user such as a driver (hereinafter simply referred to as a user) on a display image such as an operation button superimposed on the windshield by HUD based on a photographed image of the user.

Figure 1:
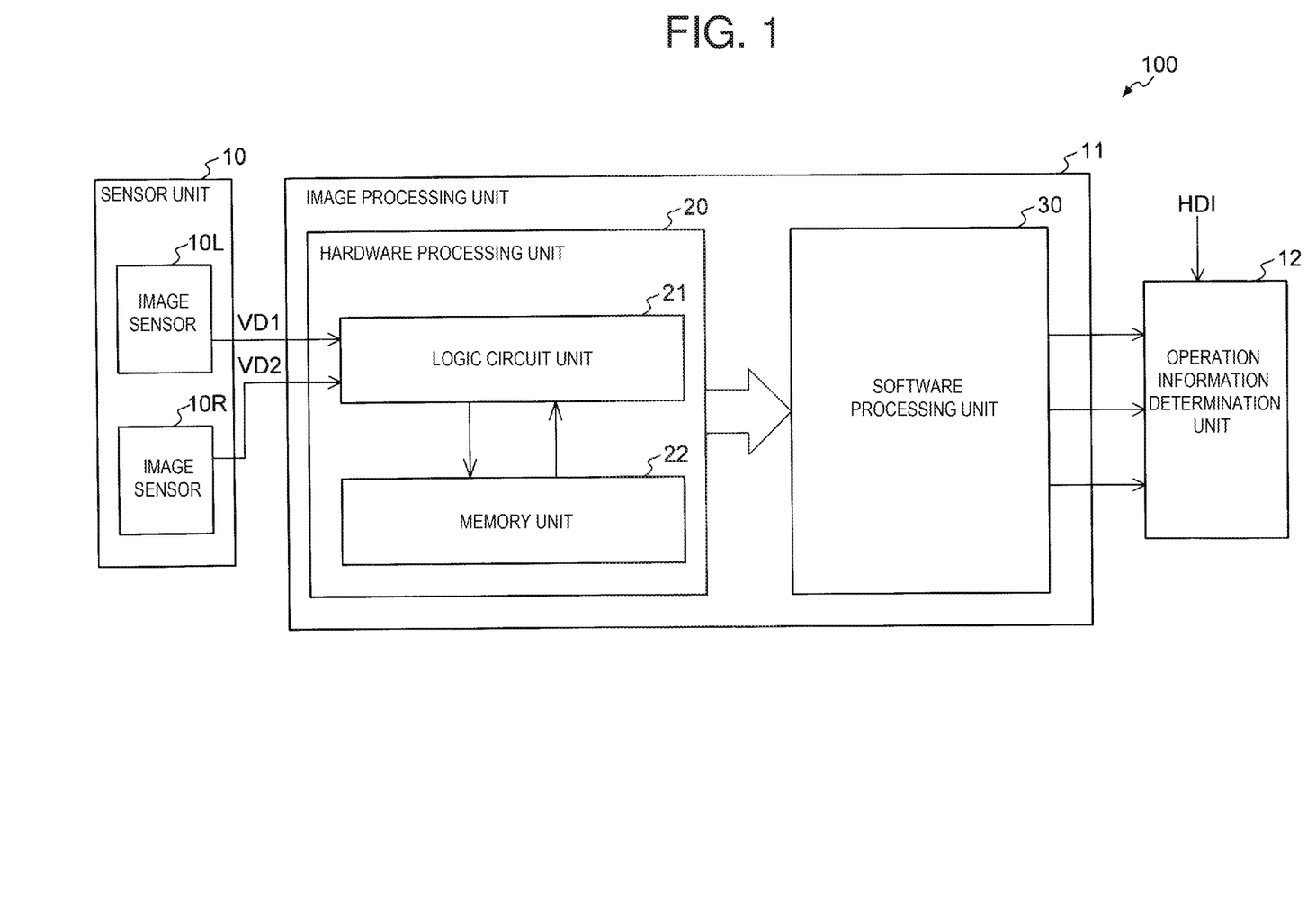
FIG. 1 is a block diagram showing a configuration of a motion operation device of Embodiment 1.

FIG. 1 is a block diagram showing the configuration of the motion operation device 100 of this embodiment. The motion operation device 100 includes a sensor unit 10, an image processing unit 11, and an operation information determination unit 12.

The sensor unit 10 includes an image sensor 10L and an image sensor 10R. The image sensors 10L and 10R, which are equipped in a camera installed inside of the vehicle, are image capturing elements that generate an image of the upper body of the user including their hands and face.

Figure 2A:
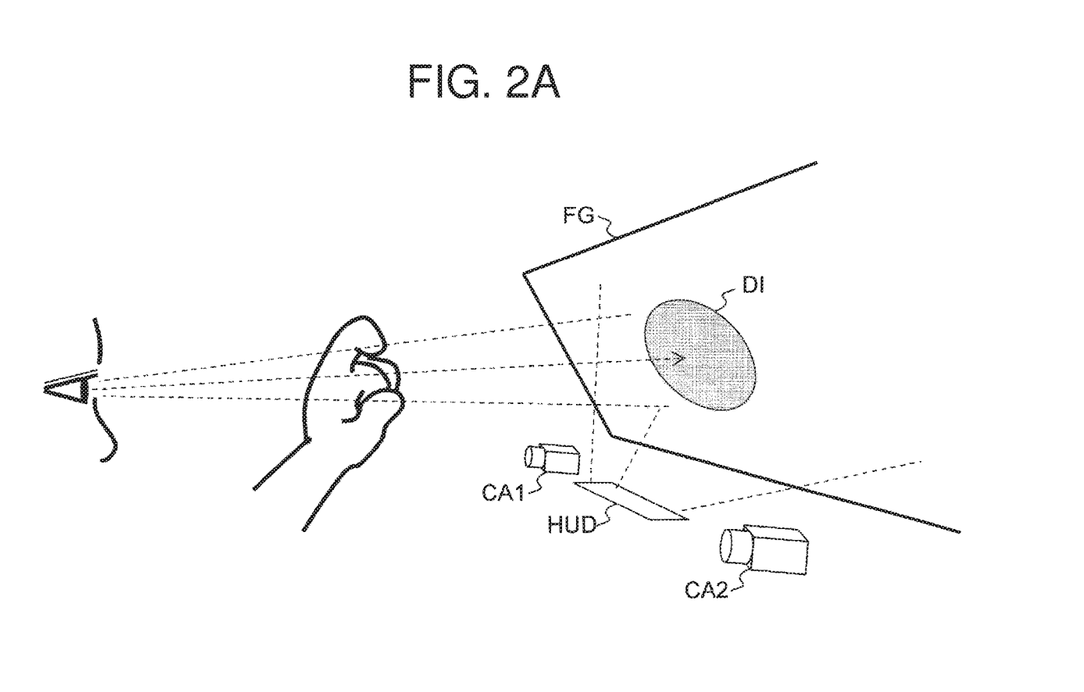
FIG. 2A is a diagram schematically showing a positional relationship between a camera, a windshield, and a user in Embodiment 1.

FIG. 2A is a diagram showing the positional relationship between the camera including the image sensors 10L and 10R, the windshield, and the user. The camera CA1 equipped with the image sensor 10L is placed between the windshield FG and the driver at the front left direction from the driver seated facing forward. The camera CA2 equipped with the image sensor 10R is placed between the windshield FG and the driver at the front right direction from the driver seated facing forward.

Figure 2B:
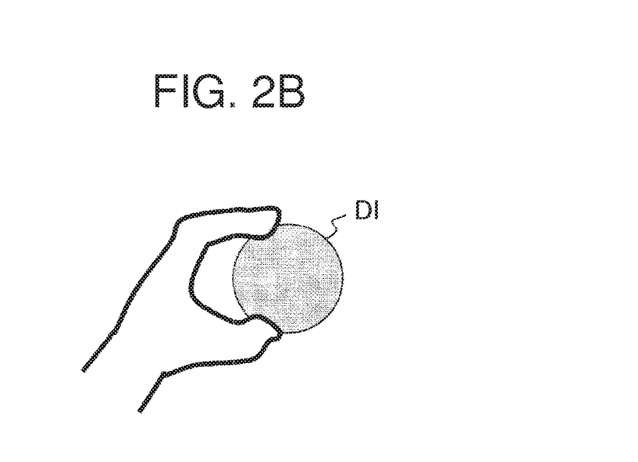
FIG. 2B is a diagram schematically showing a positional relationship between a hand and fingers of a user and a display image in Embodiment 1.

By the HUD, a display image DI showing the operation buttons and the like is displayed superimposed on the windshield FG. As shown in FIG. 2B, the user moves his/her hand and fingers as if directly touching and operating the display image DI. The cameras CA1 and CA2 respectively capture an image including the face of the user viewing the display image DI and the hand of the user making a motion to operate the display image DI.

Referring again to FIG. 1, the image sensor 10L supplies image data VD1, which is a photographed image acquired by the camera CA1, to the image processing unit 11. Similarly, the image sensor 10R supplies image data VD2, which is a photographed image acquired by the camera CA2, to the image processing unit 11.

The image processing unit 11 includes a hardware processing unit 20 and a software processing unit 30. The hardware processing unit 20 is constituted of special hardware that performs prescribed processes (that is, non-programmable processes), and includes a logic circuit unit 21 and a memory unit 22. The software processing unit 30 is constituted of a CPU (Central Processing Unit) and the like, and is a processing unit that performs processes based on software programs.

Figure 3:
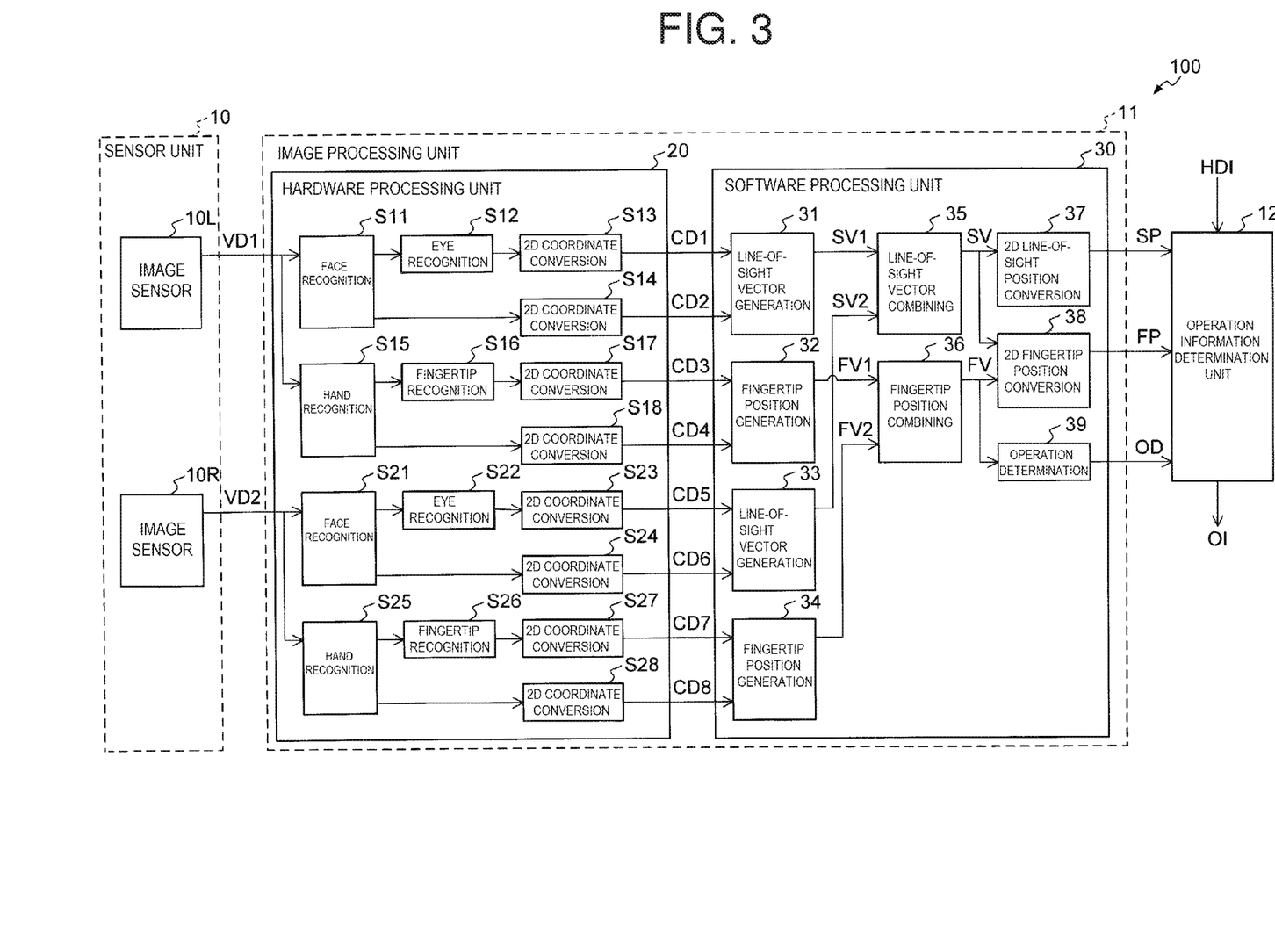
FIG. 3 is a block diagram showing processing blocks and functional blocks in the image processing unit of Embodiment 1.

FIG. 3 is a block diagram showing processing blocks of the processes performed by the hardware processing unit 20 and functional blocks formed in the software processing unit 30 by executing prescribed programs.

Based on the image data VD1 supplied from the image sensor 10L, the hardware processing unit 20 performs a detection process for detecting the positions of the user's face, eyes, hand and fingertip in the photographed image photographed by the camera CA1. The detection process to detect the positions of the face and the eyes of the user includes a face recognition process (S11), an eye recognition process (S12), an eye 2D coordinate conversion process (S13), and a face 2D coordinate conversion process (S14).

First, based on the image data VD1 supplied from the image sensor 10L, the hardware processing unit 20 conducts the face recognition process (S11) to detect the face of the user (that is, extracting an image of the face) from the two-dimensional image obtained by developing the image data VD1 on two-dimensional coordinates. In the face recognition process, for example, the position and the range where the user's face is assumed to be present are defined based on the positional relationship between the driver's seat and the camera CA1 and the like, and a skin colored region that exists at a corresponding position (for example, a central portion) in the two-dimensional image is detected, thereby recognizing the face of the user.

Next, the hardware processing unit 20 performs the eye recognition process (S12) to detect the user's eyes (that is, extracting an image of the eyes) from the detected face image. In the eye recognition process, for example, the user's eyes are detected by detecting a white region and a black region (i.e., the iris and the white part of the pupil) existing at positions assumed to have the user's eyes in the face image.

After conducting the eye recognition process (S12), the hardware processing unit 20 performs the 2D coordinate conversion process (S13) to generate the coordinate position information indicating the position of the eyes on the two-dimensional image based on the detected eye image.

Figure 4:
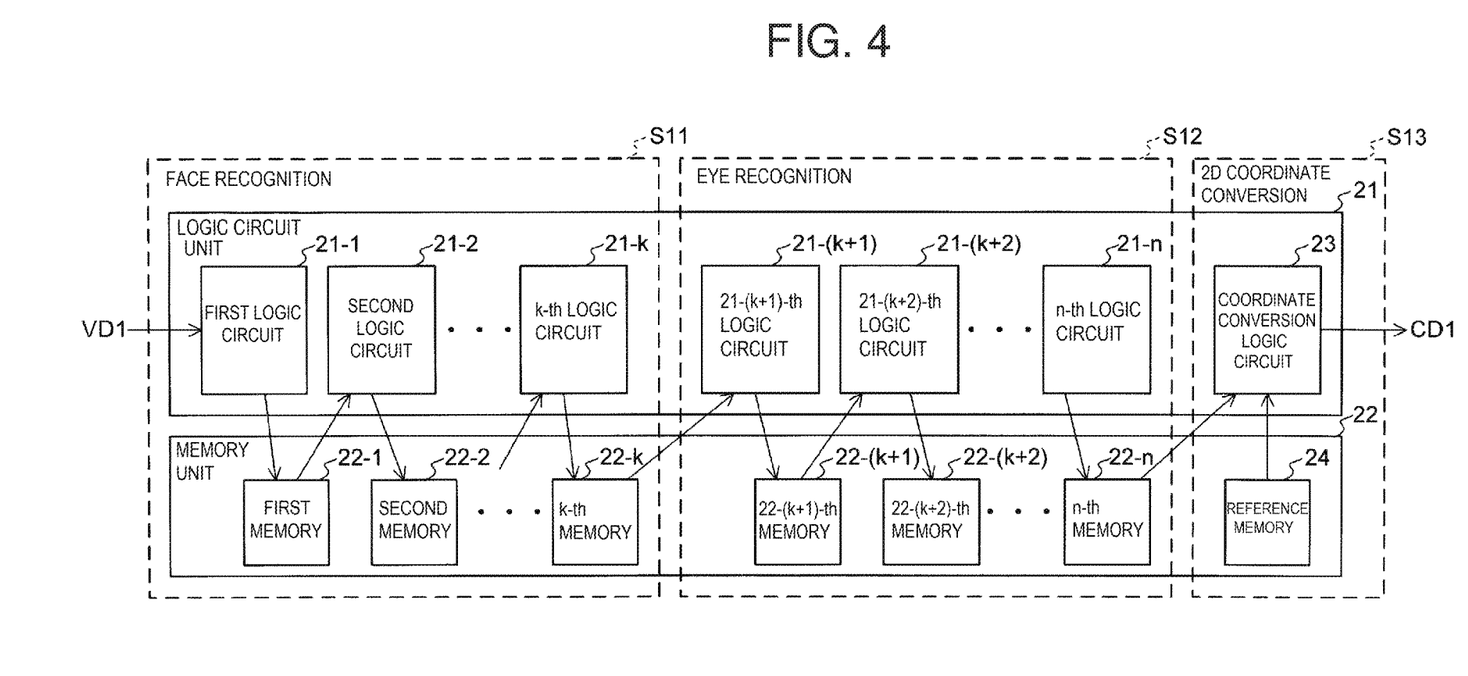
FIG. 4 is a block diagram showing a part of the configuration of a hardware processing unit.

FIG. 4 is a block diagram schematically showing the configurations of the logic circuit unit 21 and the memory unit 22, and the flow of the processing operation when executing a series of processes including the face recognition process, the eye recognition process, and the 2D coordinate conversion process.

The logic circuit unit 21 includes a logic circuit group including a first logic circuit 21-1, a second logic circuit 21-2, . . . , and an n-th logic circuit 21-n (n is an integer of 2 or more), and a coordinate conversion logic circuit 23. The memory unit 22 includes a memory group including a first memory 22-1, a second memory 22-2, . . . , and an n-th memory 22-n, and a reference memory 24. In the first memory 22-1 to the n-th memory 22-n, calculation result data by the first logic circuit 21-1 to the n-th logic circuit 21-n is respectively written. On the other hand, the reference memory 24 is a memory to store coordinate plane information, for example, and does not accept data writing by any one of the first logic circuit 21-1 to the n-th logic circuit 21-n.

The first logic circuit 21-1 to the k-th logic circuit 21-k (k is a natural number of k<n) of the logic circuit group are configured to perform the face recognition process (S11) using the first memory 22-1 to the k-th memory 22-k. At this time, each of the first logic circuit 21-1 to the k-th logic circuit 21-k performs a prescribed matrix operation on each dot (pixel), for example, to scan the entire two-dimensional image, thereby detecting the outline of the face.

Figure 5A:
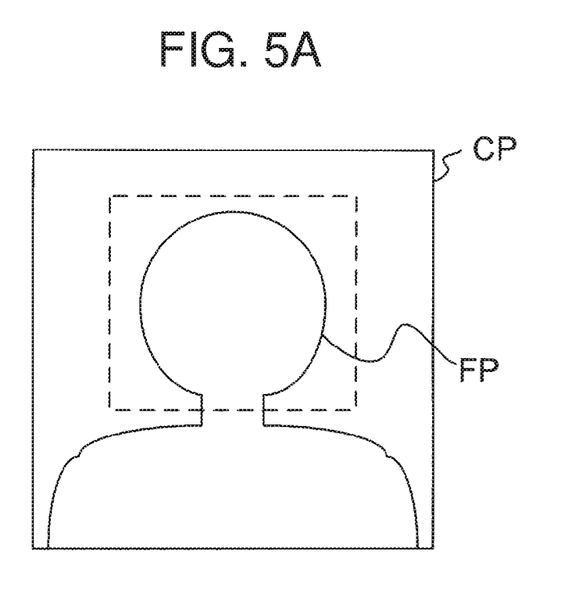
FIG. 5A is a diagram schematically showing a face recognition process.

The first logic circuit 21-1 performs a matrix operation on the image data VD1 and stores the calculation result data in the first memory 22-1. The second logic circuit 21-2 performs a matrix operation on the data read from the first memory 22-1 and stores the operation result data in the second memory 22-2. Thereafter, the same process is performed up to the k-th logic circuit 21-k, and face image data showing the final calculation result of the face recognition process is stored in the k-th memory 22-k. As a result, as shown in FIG. 5A, the face image FP is extracted from the two-dimensional image CP.

The (k+1)-th logic circuit 21-(k+1) to the n-th logic circuit 21-n in the logic circuit group perform the eye recognition process (S12) using the (k+1)-th memory 22-(k+1) to the n-th memory 22-n. At this time, each of the (k+1)-th logic circuit 21-(k+1) to n-th logic circuit 21-n performs a prescribed matrix operation on each dot (pixel), for example, to scan the entire facial image, thereby detecting the eyes.

Figure 5B:
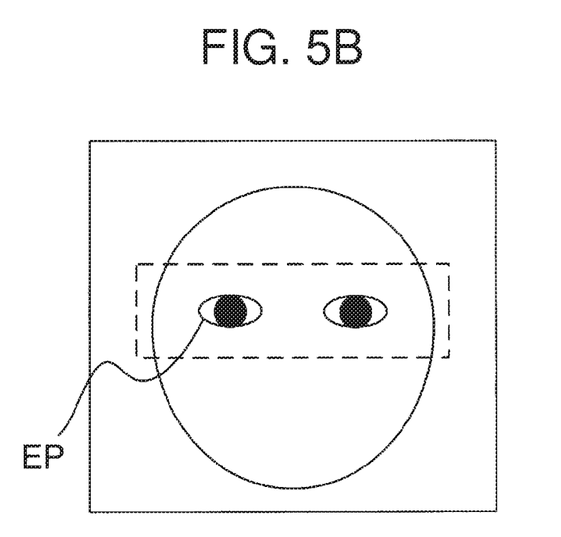
FIG. 5B is a diagram schematically showing an eye recognition process.
Figure 5C:
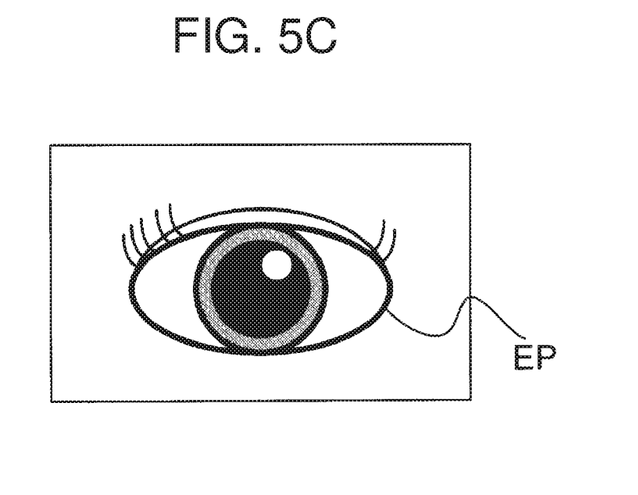
FIG. 5C is a diagram schematically showing an eye recognition process.

The (k+1)-th logic circuit 21-(*k*+1) reads out the image data of the face image FP from the k-th memory 22-*k*, after performing the matrix operation on that data, stores the operation result data in the (k+1)-th memory 22-(*k*+1). The (k+2)-th logic circuit 21-(*k*+2) reads out the data from the (k+1)-th memory 22-(*k*+1), and after performing the matrix operation on that data, stores the operation result data in the (k+2)-th memory 22-(*k*+2). Thereafter, the same process is performed to the n-th logic circuit 21-*n*, and eye image data indicating the final calculation result of the eye recognition process is stored in the n-th memory 22-*n*. As a result, as shown in FIGS. 5B and 5C, the eye image EP is extracted from the face image FP.

Figure 5D:
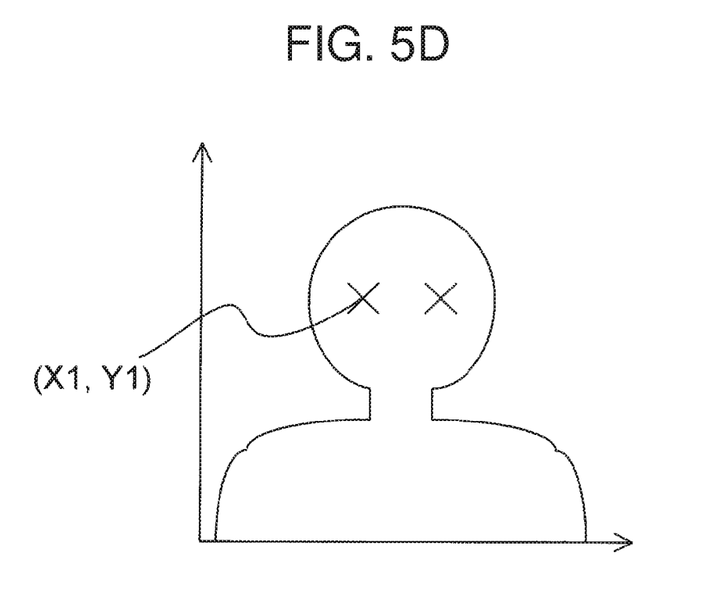
FIG. 5D is a diagram schematically showing a process of two-dimensional coordinate conversion of eyes.

The coordinate conversion logic circuit 23 conducts the 2D coordinate conversion process (S13) of the eyes, using the n-th memory 22-*n* and the reference memory 24. The coordinate conversion logic circuit 23 reads the image data of the eye image EP from the n-th memory 22-*n* and generates coordinate information CD1 indicating the position of the eyes in the two-dimensional coordinate plane based on the coordinate plane information stored in the reference memory 24. As a result, as shown in FIG. 5D, coordinates (such as (X1, Y1)) indicating the position of the eyes are obtained.

Referring again to FIG. 3, the hardware processing unit 20 performs the 2D coordinate conversion process (S14) based on the face image data detected by the face recognition process (S11), and generates coordinate position information indicating the position of the face of the user on the two-dimensional image. For example, the coordinate conversion logic circuit 23 reads out the image data of the face image FP from the k-th memory 22-*k*, and generates coordinate information CD2 indicating the position of the face in the two-dimensional coordinate plane, based on the coordinate plane information stored in the reference memory 24.

Through the processes described above, the positions of the user's face and eyes in the photographed image photographed by the camera CA1 are detected.

In parallel with this, the hardware processing unit 20 performs a process to detect the positions of the hand and fingertip of the user in the photographed image photographed by the camera CA1. The detection process to detect the positions of the hand and fingertip includes a hand recognition process (S15), a fingertip recognition process (S16), a fingertip 2D coordinate conversion process (S17), and a hand 2D coordinate process (S18).

In the hand recognition process (S15), the hardware processing unit 20 detects the user's hand from the two-dimensional image obtained by developing the image data VD1 on two-dimensional coordinates based on the image data VD1 supplied from the image sensor 10L.

As shown in FIG. 2A, when the user wishes to operate the display image DI superimposed on the windshield FG, the user's hand extends upward from a position lower than the eye position. Thus, the hardware processing unit 20 detects the hand of the user by detecting a skin color region extending from the lower side of the two-dimensional image.

Each of the logic circuits (for example, the first logic circuit 21-1 to the k-th logic circuit 21-*k*) in the first stage constituting the logic circuit unit 21 of the hardware processing unit 20 performs, in a manner similar to the face recognition process, a prescribed matrix operation on each dot (pixel) to scan the entire two dimensional image, thereby detecting the outline of the hand. The first logic circuit 21-1 performs a matrix operation on the image data VD1 and stores the calculation result data in the first memory 22-1. The second logic circuit 21-2 to the k-th logic circuits 21-*k* sequentially perform the matrix operation on the data read out from the memory and store the operation results in the memory, and stores the hand image data indicating the final calculation result of the hand recognition process in the k-th memory 22-*k*.

In the fingertip recognition process (S16), the hardware processing unit 20 detects the tip of the hand to detect the fingertip of the user. At this time, each of the (k+1)-th logic circuit 21-(*k*+1) to the n-th logic circuit 21-*n* in the second part of the logic circuit unit 21 of the hardware processing unit 20 performs a prescribed matrix operation on each dot (pixel), for example, to scan the entire hand image, thereby detecting the fingertip. The (k+1)-th logic circuit 21-(*k*+1) reads out the image data of the hand from the k-th memory 22-*k*, and after performing the matrix operation on that data, stores the operation result data in the (k+1)-th memory 22-(*k*+1). The (k+2)-th logic circuit 21-(*k*+2) to the n-th logic circuits 21-*n* sequentially perform the matrix operation on the data read from the memory and store the operation result in the memory, and then stores the image data of the fingertip position indicating the final calculation result of the fingertip recognition process in the n-th memory 22-*n*.

The coordinate conversion logic circuit 23 conducts the fingertip 2D coordinate conversion process (S17), using the n-th memory 22-*n* and the reference memory 24. The coordinate conversion logic circuit 23 reads the image data of the fingertip from the n-th memory 22-*n*, and based on the coordinate plane information stored in the reference memory 24, generates coordinate information CD3 indicating the position of the fingertip on the two-dimensional coordinate plane.

The hardware processing unit 20 performs the 2D coordinate conversion process (S18) based on the hand image data detected by the hand recognition process (S15), and generates coordinate position information indicating the position of the hand of the user on the two-dimensional image. For example, the coordinate conversion logic circuit 23 reads the image data of the hand from the k-th memory 22-*k*, and generates coordinate information CD4 indicating the position of the hand on the two-dimensional coordinate plane based on the coordinate plane information stored in the reference memory 24.

Through those processes, the positions of the hand and fingertip of the user in the photographed image photographed by the camera CA1 are detected.

The hardware processing unit 20 also performs the same processes on the image data VD2 supplied from the image sensor 10R. That is, based on the image data VD2 supplied from the image sensor 10R, the hardware processing unit 20 performs detection processes to detect the positions of the face, eyes, hand, and fingertip of the user in the photographed image photographed by the camera CA2.

The detection process to detect the face and the eyes of the user includes a face recognition process (S21), an eye recognition process (S22), an eye 2D coordinate conversion process (S23), and a face 2D coordinate conversion process (S24). The detection process to detect the positions of the hand and fingertip of the user includes a hand recognition process (S25), a fingertip recognition process (S26), a fingertip 2D coordinate conversion process (S27), and a hand 2D coordinate conversion process (S28). The hardware processing unit 20 causes the respective logic circuits of the logic circuit unit 21 to perform the matrix operation and store and read out the operation results into and from the respective memory units in sequence.

The hardware processing unit 20 outputs the eye coordinate information CD1, the face coordinate information CD2, the fingertip coordinate information CD3 and the hand coordinate information CD4 based on the image data DV1, and the eye coordinate information CD5, the face coordinate information CD6, the fingertip coordinate information CD7 and the hand coordinate information CD8 based on the image data DV2, to the software processing unit 30.

Based on the coordinate information supplied from the hardware processing unit 20, the software processing unit 30 calculates the position of the user's line-of-sight and the position of the user's fingertip with respect to the display surface (the display DS in this embodiment) where the display image DI is displayed, and determines the motion of the user's fingertip.

In the software processing unit 30, by the CPU executing the prescribed programs, respective function blocks of a line-of-sight vector generation unit 31, a fingertip position generation unit 32, a line-of-sight vector generation unit 33, a fingertip position generation unit 34, a line-of-sight vector combining unit 35, a fingertip position combining unit 36, a 2D line-of-sight position conversion unit 37, a 2D fingertip position conversion unit 38, and an operation determination unit 39 are formed.

The line-of-sight vector generation unit 31 generates a line-of-sight vector SV1 indicating the direction at which the user is looking, in accordance with the eye coordinate information CD1 and the face coordinate information CD2 based on the image data VD1. The fingertip position generation unit 32 generates a fingertip position vector FV1 indicating the position of the user's fingertip and the change thereof in accordance with the fingertip coordinate information CD3 and the hand coordinate information CD4 based on the image data VD1.

The line-of-sight vector generation unit 33 generates a line-of-sight vector SV2 indicating the direction at which the user is looking in accordance with the eye coordinate information CD5 and the face coordinate information CD6 based on the image data VD2. The fingertip position generation unit 34 generates a fingertip position vector FV2 indicating the position of the user's fingertip and the change thereof in accordance with the fingertip coordinate information CD7 and the hand coordinate information CD8 based on the image data VD2.

The line-of-sight vector combining unit 35 combines the line-of-sight vector SV1 based on the image data VD1 and the line-of-sight vector SV2 based on the image data VD2. As a result, a line-of-sight vector SV is generated that combines the line-of-sight of the user calculated based on the image captured from the front left direction of the user and the line-of-sight of the user calculated based on the image captured from the front right direction of the user.

The fingertip position combining unit 36 combines the fingertip position vector FV1 based on the image data VD1 and the fingertip position vector FV2 based on the image data VD2. As a result, a fingertip vector FV is generated that combines the fingertip of the user calculated based on the image captured from the front left direction of the user and the fingertip of the user calculated based on the image captured from the front right direction of the user.

The 2D line-of-sight position conversion unit 37 converts the line-of-sight position of the user to a two-dimensional line-of-sight position with respect to the display surface of the display image DI (that is, the windshield FG), and generates line-of-sight position information SP indicating the line-of-sight position on the display surface, based on the line-of-sight vector SV generated by the line-of-sight vector combining unit 35. The 2D line-of-sight position conversion unit 37 supplies the line-of-sight position information SP to the operation information determination unit 12.

The 2D fingertip position conversion unit 38 converts the fingertip position of the user to a two-dimensional fingertip position with respect to the display surface of the display image DI (that is, the windshield FG), and generates fingertip position information FP indicating the fingertip position on the display surface, based on the line-of-sight vector SV and the fingertip vector FV generated by the fingertip vector combining unit 36. The 2D fingertip position conversion unit 38 supplies the fingertip position information FP to the operation information determination unit 12.

The operation determination unit 39 determines a motion of the user's fingertip (for example, moving up and down, moving to draw a circle) based on the fingertip position vector FV, and generates determination information OD indicating the determination result. The operation determination unit 39 supplies the determination information OD to the operation information determination unit 12.

The operation information determination unit 12 is configured to determine what kind of operation has been performed by the user on the display image DI (such as pressing a button or flicking). The operation information determination unit 12 is supplied with display information HDI (such as the types of operation buttons displayed and the locations thereof) about the display image DI displayed by the HUD. The operation information determination unit 12 determines the operation the user has performed on the display image DI based on the display information HDI, the line-of-sight position information SP, the fingertip position information FP, and the determination information OD supplied from the image processing unit 11. The operation information determination unit 12 supplies the operation information OI indicating the determination result to another device such as a navigation device (not shown in the figure).

Through the operations of the hardware processing unit 20, the software processing unit 30, and the operation information determination unit 12 described above, the operation performed by the user while viewing the display image superimposed on the windshield is determined as a non-contact operation performed on the display image such as operation buttons.

In the motion operation device 100 of this embodiment, the hardware processing unit 20, which is constituted of special hardware configured to perform prescribed detection processes only conducts detection processes to detect the positions of face, eyes, hand and fingertip of the user in the photographed image (that is, the recognition processes of the face, eyes, hand and fingertip, and the two-dimensional coordinate conversion process). Since such processes include a process of repeatedly executing a matrix operation for each pixel to scan the entire two-dimensional image, the process steps are more than that of the subsequent processes (generating and combining the line-of-sight vectors and the fingertip position vectors, converting the positions, and determining the operation).

Unlike this embodiment, if the above-described detection processes were performed by software, the CPU would need to access the memory commonly used for the respective processes every time, and therefore, the processing would take a much longer time. On the other hand, in the motion operation device 100 of this embodiment, the hardware processing unit 20 performs these processes by using logic circuits each executing a prescribed matrix operation process and memory units each storing data for the matrix operation process, the processing can be done in a relatively short time (that is, at higher speed). The reduction in processing time also reduces the power consumption.

Therefore, according to the motion operation device 100 of this embodiment, it is possible to perform the operation determination based on the operation of the user with high speed and low power consumption.

Embodiment 2

Figure 7:
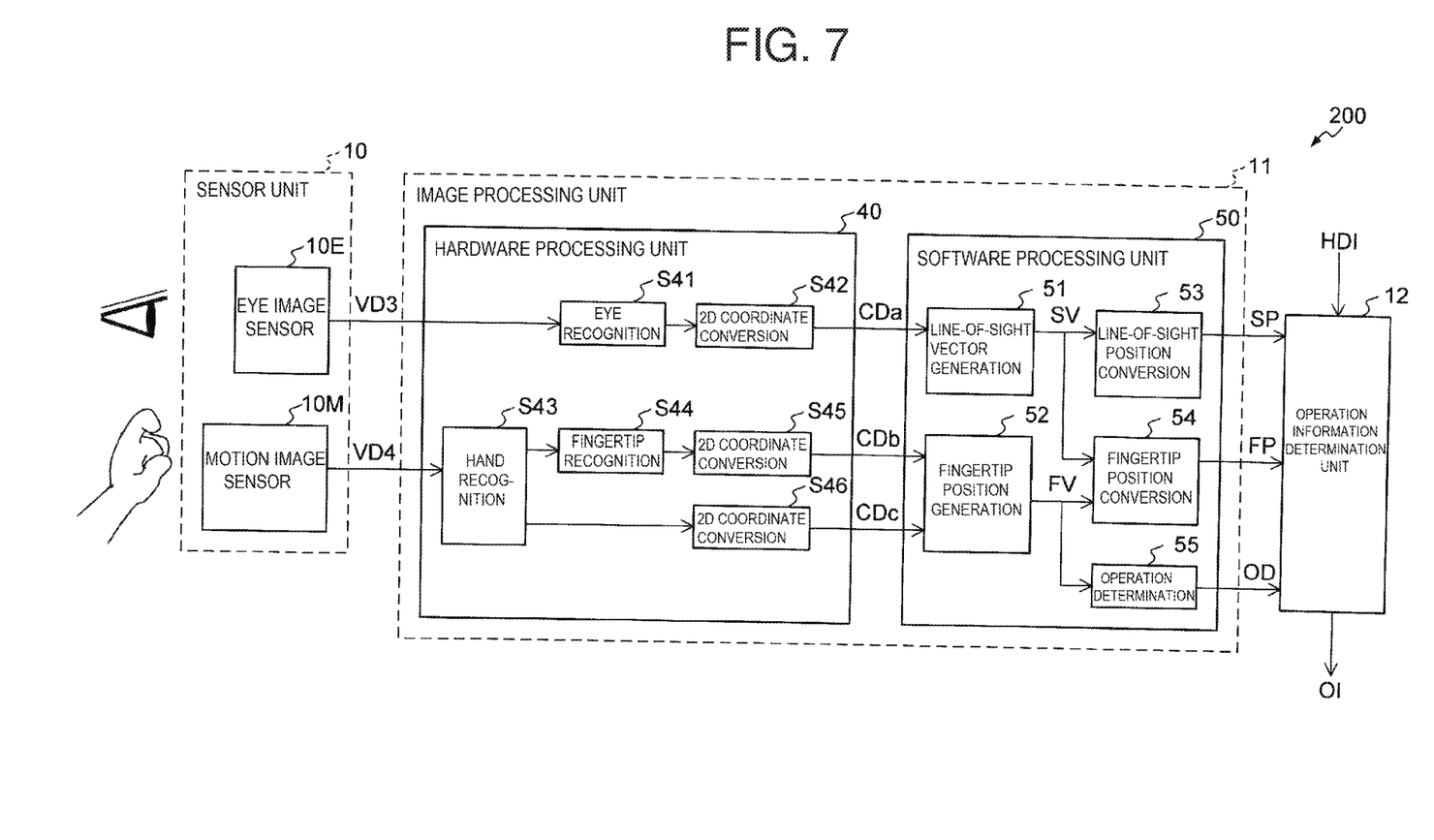
FIG. 7 is a block diagram showing processing blocks and functional blocks in the image processing unit of Embodiment 2.

A motion operation device 200 of this embodiment is installed in an HMD (Head Mounted Display) that performs AR (Augmented Reality) display, for example. The motion operation device 200 detects a motion of the user based on the image that captures the eyes and hands of the user wearing a goggle type HMD, thereby determining a non-contact operation performed by the user on the display image such as operation buttons shown on the display.

Figure 6A:
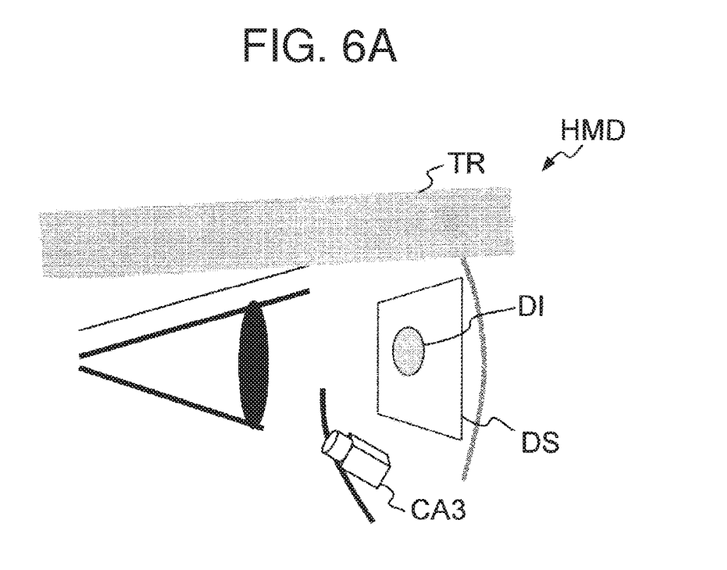
FIG. 6A is a diagram schematically showing a positional relationship between a camera, a display, and the eyes of a user in Embodiment 2.
Figure 6B:
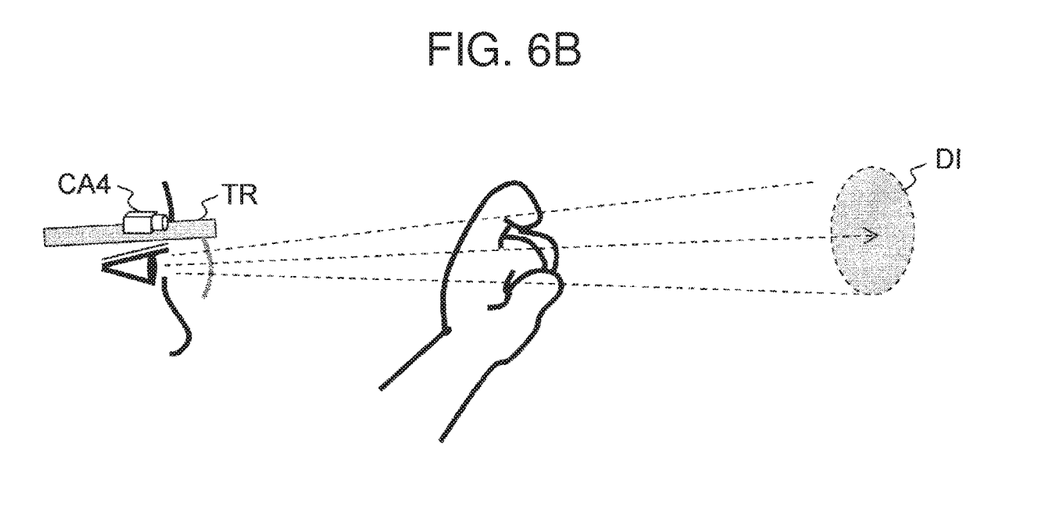
FIG. 6B is a diagram schematically showing a positional relationship between a user and a display image in Embodiment 2.

FIGS. 6A and 6B are diagrams schematically showing the arrangement of the cameras installed in the HMD in this embodiment, the display image shown on the display, and the positions of the eyes and hands of the user wearing the HUD.

As shown in FIG. 6A, the HMD is provided with a camera CA3 for photographing an area near the user's eyes. The camera CA3 is disposed, for example, in the nose pad portion (not shown in the figure) of the goggle. A display image DI such as operation buttons is displayed on the display DS.

As shown in FIG. 6B, the HMD is provided with a camera CA4 for photographing the area in front of the user's eyes. The camera CA4 is arranged, for example, in an arm TR of the goggle. When viewed from the user's eyes, the display image DI is displayed as a virtual image at a position further ahead of the display DS. Therefore, when the user moves his/her hand as if touching the display image DI such as an operation button displayed as a virtual image, the hand of the user comes into the image capturing area of the camera CA4. Therefore, the hand of the user is photographed by the camera CA4.

FIG. 7 is a block diagram showing the configuration of the motion operation device 200 of this embodiment, and processing blocks and functional blocks in the image processing unit. The motion operation device 200 includes a sensor unit 10, an image processing unit 11, and an operation information determination unit 12.

The sensor unit 10 includes an eye image sensor 10E and a motion image sensor 10M.

The eye image sensor 10E is installed in the camera CA3 that photographs an area near the user's eyes. The eye image sensor 10E supplies image data VD3 obtained by the camera CA3 to the image processing unit 11.

The motion image sensor 10M is mounted on the camera CA4 that captures an image of the user's hand. The motion image sensor 10M supplies the image processing unit 11 with image data VD4 obtained by the camera CA4.

The image processing unit 11 includes a hardware processing unit 40 constituted of special hardware for performing prescribed processes (that is, non-programmable processes), and a software processing unit 50 constituted of a CPU and the like.

In a manner similar to the hardware processing unit 20 of Embodiment 1 shown in FIG. 4, the hardware processing unit 40 includes a logic circuit unit constituted of a plurality of logic circuits and a memory unit.

The hardware processing unit 40 performs a detection process to detect the position of the user's eyes in the photographed image photographed by the camera CA3 based on the image data VD3 supplied from the eye image sensor 10E. The detection process to detect the position of the eyes of the user includes an eye recognition process (S41) and an eye 2D coordinate conversion process (S42).

Based on the image data VD3 supplied from the eye image sensor 10E, the hardware processing unit 40 performs the eye recognition process (S41) that detects the eyes of the user (that is, extracting an image of the eyes) from the two-dimensional image obtained by developing the image data VD3 on two-dimensional coordinates. The hardware processing unit 40 also performs the 2D coordinate conversion process (S42) to generate coordinate position information representing the position of the eyes on the two-dimensional image based on the detected eye image.

In a manner similar to the hardware processing unit 20 of Embodiment 1, the hardware processing unit 40 causes the plurality of logic circuits to perform the matrix operation and store and read out the operation result into and from the memory units in sequence.

In parallel with this, the hardware processing unit 40 performs a process to detect the positions of the hand and fingertip of the user in the photographed image photographed by the camera CA4, based on the image VD4 supplied from the motion image sensor 10M. The detection process to detect the positions of the hand and fingertip includes a hand recognition process (S43), a fingertip recognition process (S44), a fingertip 2D coordinate conversion process (S45), and a hand 2D coordinate process (S45).

In a manner similar to the hardware processing unit 20 of Embodiment 1, the hardware processing unit 40 causes the plurality of logic circuits to perform the matrix operation and store and read out the operation result into and from the memory units in sequence.

The hardware processing unit 40 outputs eye coordinate information CDa, fingertip coordinate information CDb, and hand coordinate information CDc to the software processing unit 50.

In the software processing unit 50, by the CPU executing prescribed programs, a line-of-sight vector generation unit 51, a fingertip position generation unit 52, a line-of-sight position conversion unit 53, a fingertip position conversion unit 54, and an operation determination unit 55 are formed as functional blocks.

The line-of-sight vector generation unit 51 generates a line-of-sight vector SV indicating the direction at which the user is looking based on the eye coordinate information CDa. The fingertip position generation unit 52 generates a fingertip position vector FV indicating the position of the user's fingertip and the change thereof based on the fingertip coordinate information CDb and the hand coordinate information CDc.

The line-of-sight position conversion unit 53 converts the line-of-sight position of the user to a two-dimensional line-of-sight position with respect to the display DS based on the line-of-sight vector SV, and generates line-of-sight position information SP indicating the line-of-sight position on the display surface. The line-of-sight position conversion unit 53 supplies the line-of-sight position information SP to the operation information determination unit 12.

The fingertip position conversion unit 54 generates fingertip position information FP indicating the virtual fingertip position on the display DS based on the line-of-sight vector SV and the fingertip position vector FV. The fingertip position conversion unit 54 supplies the fingertip position information FP to the operation information determination unit 12.

The operation determination unit 55 determines a motion of the user's fingertip based on the fingertip position vector FV, and generates determination information OD indicating the determination result. The operation determination unit 55 supplies the determination information OD to the operation information determination unit 12.

The operation information determination unit 12 is configured to determine what kind of operation has been performed by the user on the display image DI. The operation information determination unit 12 is supplied with display information HDI about the display image DI displayed by the HMD. The operation information determination unit 12 determines the operation performed by the user on the display image DI based on the display information HDI, the line-of-sight position information SP, the fingertip position information FP, and the determination information OD. The operation information determination unit 12 supplies operation information OI indicating the determination result to another device such as a navigation device (not shown in the figure).

With the operations of the hardware processing unit 40, the software processing unit 50, and the operation information determination unit 12 as described above, an operation performed by the user while viewing the display image displayed on the goggle type HMD is determined as a non-contact operation for the operation buttons or the like.

In the motion operation device 200 of this embodiment, the hardware processing unit 40, which is constituted of special hardware configured to perform prescribed detection processes only, conducts detection processes to detect the positions of eyes, hand and fingertip of the user in the photographed image (that is, the recognition processes of the eyes, hand and fingertip, and the two-dimensional coordinate conversion process). Since those processes include a process of repeatedly executing a matrix operation for each pixel to scan the entire two-dimensional image, a greater number of process steps are performed compared to the subsequent processes (generating a line-of-sight vector and a fingertip position vector, converting the positions, and determining the operation).

In the motion operation device 200 of this embodiment, these processes are performed by logic circuits that each execute a prescribed matrix operation process and memory units that each store data on the matrix operation process, and therefore, the processing can be done in a relatively short time (that is, at higher speed). The reduction in processing time also reduces the power consumption.

Therefore, according to the motion operation device 200 of this embodiment, it is possible to perform the operation determination based on the operation of the user with high speed and low power consumption.

The present invention is not limited to the embodiments described above. For example, in Embodiment 1, the case where the hardware processing unit 20 first performs the face recognition process (S11) and then the eye recognition process (S12) was described as an example. However, it is also possible to configure the respective logic circuits of the hardware processing part 20 such that the eye recognition process is conducted whether the face recognition process has already been conducted or not.

A calibration process may be performed before the face recognition process in Embodiment 1 and before the eye recognition process in Embodiment 2. For example, prior to these processes, a face image of the user seated in the driver's seat (Embodiment 1) or wearing the goggle (Embodiment 2) is photographed, thereby obtaining the reference information for the position of the face and the position of the eyes. The hardware processing unit can perform the series of processes more smoothly by referring to such reference information in the face recognition process and the eye recognition process.

The calibration information can also be used for the hand recognition process. For example, it is possible to detect, as a hand, a skin-colored object that was not present in the two-dimensional image at the time of calibration but framed into the two-dimensional image at the time of actual operation.

In the embodiments described above, the case where each of the logic circuits constituting the logic circuit unit 21 reads out data that was stored in the memory by the immediately preceding logic circuit (or in other words, the calculation result of the immediately preceding logic circuit) and performs the matrix operation on such data was explained as an example. However, the present invention is not limited to this, and each logic circuit may be configured such that the matrix operation is performed on the data that was stored in the memory by a logic circuit that is two or more circuits ahead of the performing circuit (the calculation result data by a logic circuit that is two or more circuits ahead). Alternatively, each logic circuit may perform the matrix operation based on the data read out from a plurality of memory units.

Further, in the embodiments described above, the case where the coordinate conversion logic circuit 23 generates the coordinate information CD based on the data (image data of the eye image EP) read from the nth memory 22-$n$ and the data (coordinate plane information) read from the reference memory 24, but the other logic circuits from the second logic circuit 21-2 to the (n–1)-th logic circuit 21-($n$–1) each perform the matrix operation based on the data read out from the first memory 22-1 to the (n–1)-th memory 22-($n$–1) (that is, the reference memory is not used) was explained as an example. However, the first logic circuit 21-1 to the n-th logic circuit 21-$n$ may be configured to perform the matrix operation using data read out from another reference memory (that is, a memory not subjected to the data writing by the logic circuits).

Further, in the embodiments described above, the reference memory 24 was not subjected to the data writing by the first logic circuit 21-1 to the n-th logic circuit 21-$n$. However, the reference memory 24 of the memory unit 22 of the hardware processing unit 20 may be configured to be rewritable through external access. Therefore, although the hardware processing unit 20 executes prescribed processes only, part of the parameters and the like used for the prescribed processes can be changed according to the rewriting of the reference memory from the outside.

In the embodiments described above, the case where the software processing unit conducts the respective processes of generating the line-of-sight vectors and the fingertip positions, combining the line-of-sight vectors and the fingertip positions, converting the line-of-sight positions and fingertip positions, and determining the operation was described as an example. However, these processes may be executed by hardware. That is, in the motion operation device of the present invention, the hardware processing unit needs to conduct at least the recognition processes of face, eyes, hand and fingertip of the user based on the image data and the process of two-dimensional coordinate conversion, but the other processes may be conducted by either software or hardware.

DESCRIPTIONS OF THE REFERENCE CHARACTERS

10 Sensor Unit
10L, 10R Image Sensor

10E Eye Image Sensor
10M Motion Image Sensor
11 Image Processing Unit
12 Operation Information Determination Unit
20, 40 Hardware Processing Unit
21 Logic Circuit Unit
22 Memory Unit
23 Coordinate Logic Circuit
24 Reference Memory
30, 50 Software Processing Unit
31, 33 Line-of-sight Vector Generation Unit
32, 34 Fingertip Position Generation Unit
35 Line-of-sight Vector Combining Unit
36 Fingertip Position Combining Unit
37 2D Line-of-sight Position Conversion Unit
38 2D Fingertip Position Conversion Unit
39 Operation Determination Unit
51 Line-of-sight Vector Generation Unit
52 Fingertip Position Generation unit
53 Line-of-sight Position Conversion Unit
54 Fingertip Position Conversion Unit
55 Operation Determination Unit

What is claimed is:

1. An operation determination device configured to determine an operation performed by a user in a non-contact manner on a display image, comprising:
an image acquisition unit that acquires a photographed image of the user, the photographed image including both a fingertip of the user and eyes of the user; and
an image processing unit that performs image processing on the photographed image and that determines a position of a line-of-sight of the user based on a position of the eyes in the photographed image, a position of the fingertip of the user in the photographed image, and a motion of the user's fingertip with respect to the display image,
wherein the image acquisition unit acquires first image data obtained by a left image sensor placed in a front left direction with respect to the user, and second image data obtained by right image sensor placed in a front right direction with respect to the user, wherein the image processing unit includes:
a first processing unit configured to detect positions of the eyes and the fingertip of the user in the photographed image; and
a second processing unit that calculates positions of the line-of-sight and the fingertip of the user with respect to a display surface where the display image is displayed, based on the detected positions of the eyes and the fingertip of the user in the photographed image and that determines a motion of the fingertip of the user,
wherein the first processing unit is constituted of hardware that executes prescribed detection processes of the eyes and the fingertip of the user, and the second processing unit is constituted of software executed on a processor that executes the calculations of the positions of the line-of-sight and the fingertip of the user with respect to the display surface based on an output of the first processing unit,
wherein
to generate the output, the first processing unit includes
first hardware configured to, based on the first image data, generate first coordinate position information indicating the positions of the eyes and the fingertip of the user on a two-dimensional image, and
second hardware configured to, based on the second image data, generate second coordinate position information indicating the positions of the eyes and the fingertip of the user on the two-dimensional image, and
wherein
the first hardware includes
first face recognition hardware configured to perform a face recognition process based on the first image data,
first eye recognition hardware configured to perform an eye recognition process based on an output of the first face recognition hardware,
first 2D coordinate conversion hardware configured to generate coordinate position information indicating the position of the eyes on the two-dimensional image, based on an output of the first eye recognition hardware,
first hand recognition hardware configured to perform a hand recognition process based on the first image data,
first fingertip recognition hardware configured to perform a fingertip recognition process based on an output of the first hand recognition hardware, and
second 2D coordinate conversion hardware configured to generate coordinate position information indicating the position of the fingertip on the two-dimensional image, based on an output of the first fingertip recognition hardware, and
the second hardware includes
second face recognition hardware configured to perform a face recognition process based on the second image data,
second eye recognition hardware configured to perform an eye recognition process based on an output of the second face recognition hardware,
third 2D coordinate conversion hardware configured to generate coordinate position information indicating the position of the eyes on the two-dimensional image, based on an output of the second eye recognition hardware,
second hand recognition hardware configured to perform a hand recognition process based on the second image data,
second fingertip recognition hardware configured to perform a fingertip recognition process based on an output of the second hand recognition hardware, and
fourth 2D coordinate conversion hardware configured to generate coordinate position information indicating the position of the fingertip on the two-dimensional image, based on an output of the second fingertip recognition hardware.

2. The operation determination device according to claim 1,
wherein the first processing unit converts the position of the user's eyes and the position of the user's fingertip in the photographed image into position coordinates on a two-dimensional coordinate plane, and
wherein the second processing unit calculates the positions of the user's line-of-sight and fingertip with respect to the display surface based on the position coordinates.

3. The operation determination device according to claim 2,
wherein the plurality of logic circuits sequentially execute a matrix operation on the photographed image, and the first processing unit detects the positions of the eyes and the fingertip of the user in the photographed image based on calculation results of the matrix operations by the plurality of logic circuits.

4. The operation determination device according to claim 3,
wherein the plurality of memory units respectively store the calculation results of the matrix operations of the plurality of logic circuits, and
wherein each of the plurality of logic circuits executes the matrix operation based on data read from the corresponding memory unit among the plurality of memory units.

5. The operation determination device according to claim 1,
wherein the second processing unit calculates the position of the line-of-sight of the user with respect to the display surface based on the position of the eyes of the user in the first photographed image and the position of the eyes of the user in the second photographed image, and calculates the position of the user's fingertip with respect to the display surface based on the position of the fingertip of the user in the first photographed image and the position of the fingertip of the user in the second photographed image.

6. An operation determination device configured to determine an operation performed by a user in a non-contact manner on a display image, comprising:
an image acquisition unit that acquires a photographed image of the user; and
an image processing unit that performs image processing on the photographed image and that determines a position of a line-of-sight of the user, a position of a fingertip of the user, and a motion of the user's fingertip with respect to the display image,
wherein the image processing unit includes:
a first processing unit configured to detect positions of the eyes and the fingertip of the user in the photographed image; and
a second processing unit that calculates positions of the line-of-sight and the fingertip of the user with respect to a display surface where the display image is displayed, based on the detected positions of the eyes and the fingertip of the user in the photographed image and that determines a motion of the fingertip of the user,
wherein the first processing unit is constituted of hardware that executes prescribed detection processes of the eyes and the fingertip of the user, and the second processing unit is constituted of software executed on a processor that executes the calculations of the positions of the line-of-sight and the fingertip of the user with respect to the display surface based on an output of the first processing unit,
wherein the image acquisition unit acquires a first photographed image of the eyes of the user and a second photographed image of a hand of the user,
wherein the first processing unit detects a position of the eyes of the user in the first photographed image and a position of a fingertip of the user in the second photographed image,
wherein the second processing unit calculates the position of the line-of-sight of the user with respect to the display surface based on the position of the eyes of the user in the first photographed image, and calculates the position of the fingertip of the user with respect to the display surface based on the position of the fingertip of the user in the second photographed image,
wherein the first processing unit converts the position of the user's eyes and the position of the user's fingertip in the photographed image into position coordinates on a two-dimensional coordinate plane,
wherein the second processing unit calculates the positions of the user's line-of-sight and fingertip with respect to the display surface based on the position coordinates, and
wherein the first processing unit includes a plurality of logic circuits that sequentially execute a matrix operation on the photographed image, and the first processing unit detects the positions of the eyes and the fingertip of the user in the photographed image based on the calculation results of the matrix operations by the plurality of logic circuits.

7. An operation determination method in a motion operation device that receives a non-contact operation performed by a user on a display image, comprising:
acquiring a photographed image obtained by photographing the user, the photographed image including both a fingertip of the user and eyes of the user;
detecting positions of eyes and a fingertip of the user in the photographed image by hardware configured to execute prescribed detection processes;
calculating, by software executed by a processor, positions of a line-of-sight and the fingertip of the user with respect to a display surface where the display image is displayed; and
determining, by software executed by the processor, a motion of the fingertip of the user with respect to the display image; wherein
the acquiring includes acquiring first image data obtained by a left image sensor placed in a front left direction with respect to the user, and second image data obtained by a right image sensor placed in a front right direction with respect to the user, and
the detecting the positions of the eyes and the fingertip of the user includes
executing operations using a plurality of logic circuits and memory units of the hardware, each of the plurality of logic circuits being configured to supply an operation result to a corresponding memory unit, and the corresponding memory unit being configured to supply the operation result to a next logic circuit in a sequence of the plurality of logic circuits,
using first hardware configured to, based on the first image data, generate first coordinate position information indicating the positions of the eyes and the fingertip of the user on a two-dimensional image, and
using second hardware configured to, based on the second image data, generate second coordinate position information indicating the positions of the eyes and the fingertip of the user on the two-dimensional image,
wherein the using the first hardware comprises including in the first hardware
first face recognition hardware configured to perform a face recognition process based on the first image data,
first eye recognition hardware configured to perform an eye recognition process based on an output of the first face recognition hardware,
first 2D coordinate conversion hardware configured to generate coordinate position information indicating the position of the eyes on the two-dimensional image, based on an output of the first eye recognition hardware, first hand recognition hardware configured to perform a hand recognition process based on the first image data, first fingertip recognition hardware configured to perform a fingertip recognition process based on an output of the first hand recognition hardware, and second 2D coordinate conversion hardware configured to generate coordinate position information indicating the position of the fingertip on the two-dimensional image, based on an output of the first fingertip recognition hardware, and wherein the using the second hardware comprises including in the second hardware second face recognition hardware configured to perform a face recognition process based on the second image data, second eye recognition hardware configured to perform an eye recognition process based on an output of the second face recognition hardware, third 2D coordinate conversion hardware configured to generate coordinate position information indicating the position of the eyes on the two-dimensional image, based on an output of the second eye recognition hardware, second hand recognition hardware configured to perform a hand recognition process based on the second image data, second fingertip recognition hardware configured to perform a fingertip recognition process based on an output of the second hand recognition hardware, and fourth 2D coordinate conversion hardware configured to generate coordinate position information indicating the position of the fingertip on the two-dimensional image, based on an output of the second fingertip recognition hardware.

8. The operation determination method according to claim 7, wherein the operations executed in the detecting the positions of the line-of-sight and fingertip of the user in the photographed image include:

sequentially executing a matrix operation on the photographed image by the plurality of logic circuits; and converting the positions of eyes and fingertip of the user in the photographed image into position coordinates in a two-dimensional coordinate plane.

9. The operation determination device according to claim 1, wherein the display image corresponds to an image superimposed on a windshield by a head-up display (HUD) located between the left image sensor and the right image sensor.

* * * * *